(No Model.) 2 Sheets—Sheet 1.

E. D. PRIEST.
SERIES PARALLEL CONTROLLER.

No. 516,834. Patented Mar. 20, 1894.

WITNESSES
a. F. Macdonald
J. J. Livermore

INVENTOR
Edward D. Priest,
By Bentley & Blodgett
Attys.

(No Model.) 2 Sheets—Sheet 2.

E. D. PRIEST.
SERIES PARALLEL CONTROLLER.

No. 516,834. Patented Mar. 20, 1894.

WITNESSES  
Henry O. Westendarp  
S. F. Livermore

INVENTOR  
Edward D. Priest,  
By Bentley & Blodgett,  
Attys.

UNITED STATES PATENT OFFICE.

EDWARD D. PRIEST, OF LYNN, ASSIGNOR TO THE GENERAL ELECTRIC COMPANY, OF BOSTON, MASSACHUSETTS.

SERIES-PARALLEL CONTROLLER.

SPECIFICATION forming part of Letters Patent No. 516,834, dated March 20, 1894.

Application filed December 1, 1893. Serial No. 492,428. (No model.)

*To all whom it may concern:*

Be it known that I, EDWARD D. PRIEST, a citizen of the United States, residing at Lynn, in the county of Essex and State of Massachusetts, have invented certain new and useful Improvements in Series-Parallel Controllers, of which the following is a specification.

My invention relates to controllers for electric motors, and consists in an improved method of controlling or governing the speed of a number of motors adapted to co-operate in doing the same work, as, for example, a number of motors driving a single vehicle or train of vehicles. My invention consists in changing the said motors gradually from series to parallel relation, starting with all the motors in series, preferably with a small resistance, and ending with all the motors in parallel without any resistance in the circuit. By means of my invention the series-parallel system of control can be extended to any number of motors, since the said motors are successively operated upon, two motors being first changed from series to parallel relation while the remainder are left in series and brought one at a time into the parallel circuit until all are in parallel relation to one another. It is further contemplated, in some cases, to arrange a number of motors in series pairs, and treat each pair as a simple element in the control, just as if it were a single motor, as will be more fully set forth hereinafter.

Figure 1:
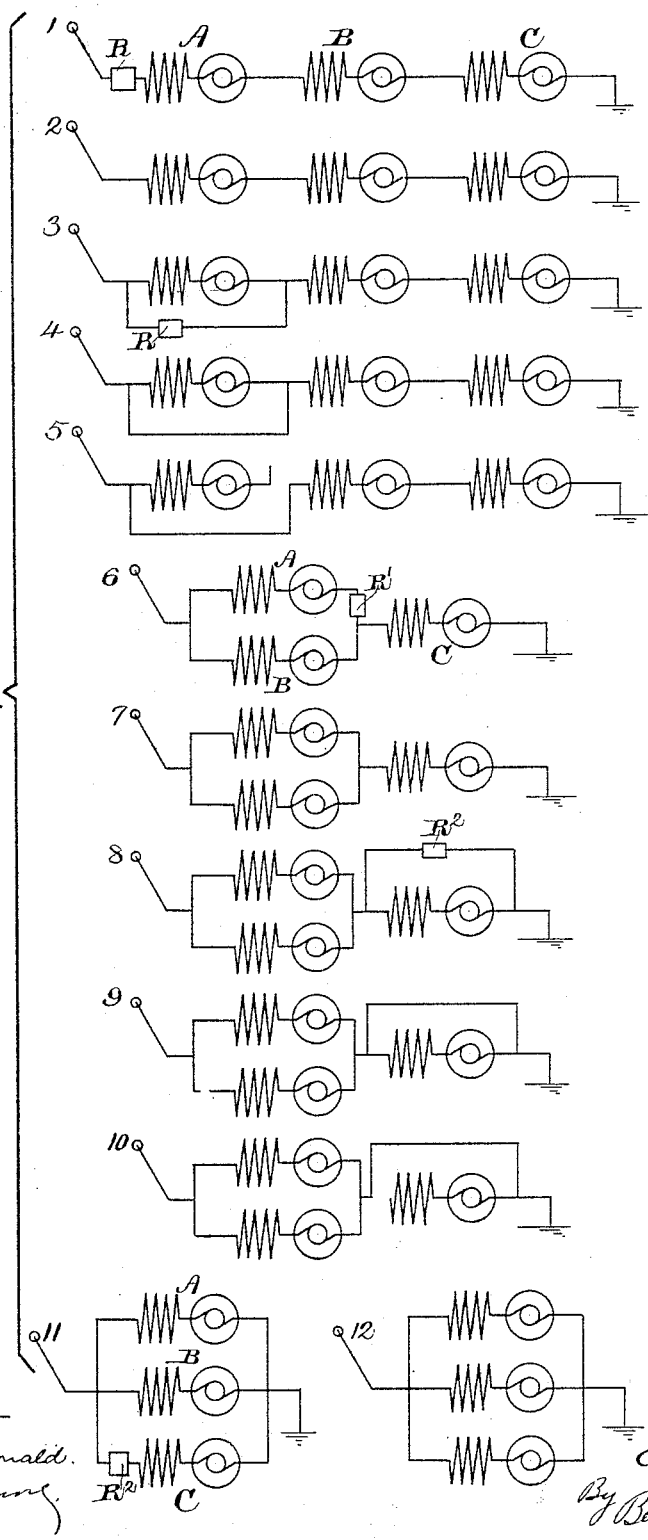
Figure 2:
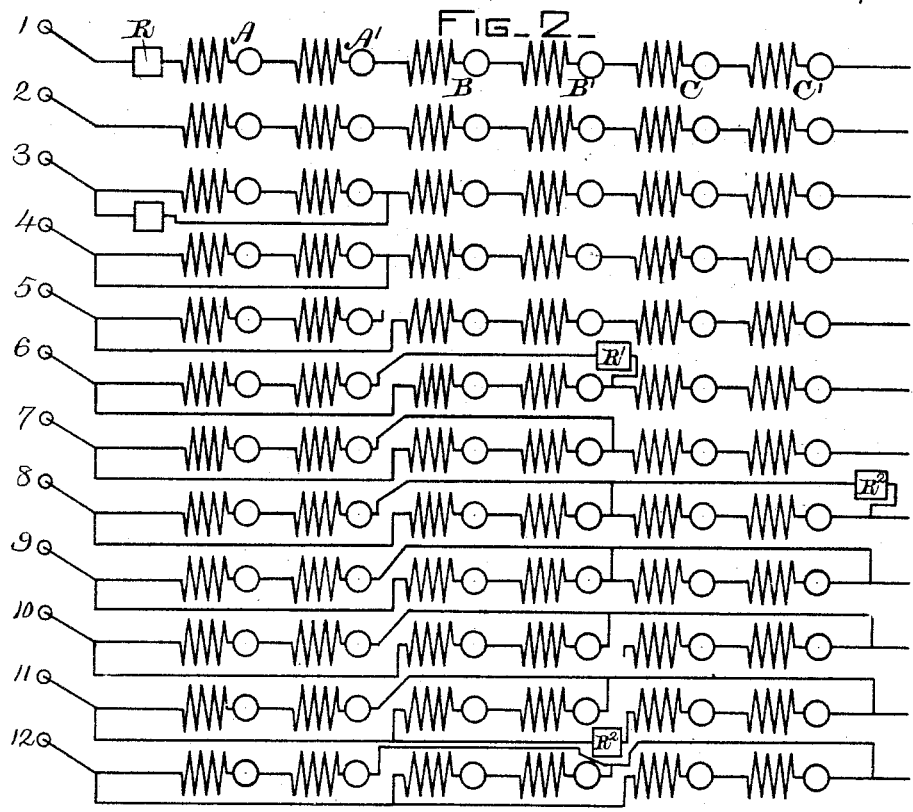

In the accompanying drawings, Figure 1 is a series of diagrams showing the consecutive combinations of three motors. Fig. 2 is a similar series of diagrams showing six motors arranged in pairs; and Fig. 3 is a development of the surface of the switch and diagram of the connections.

Figure 3:
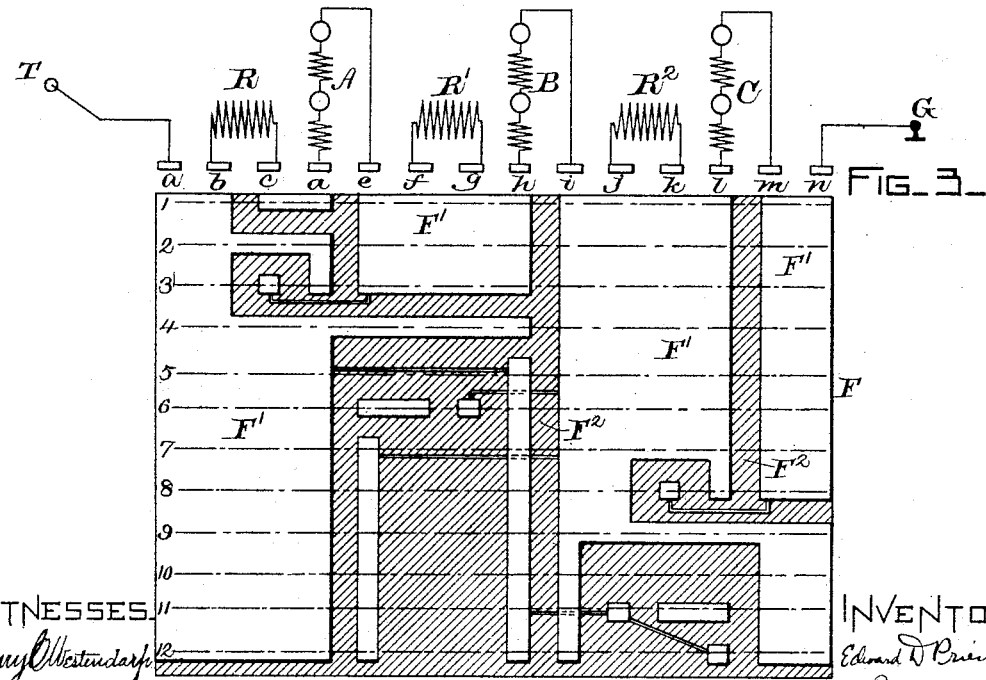

Referring to the accompanying drawings, the motors A, B and C, Fig. 1, are series-wound motors, which may be respectively connected with three other motors, A', B' and C', in series pairs, as best shown in Fig. 3.

In the following description reference will be mainly made to Figs. 2 and 3, the arrangement of a number of motors in series pairs having been found an efficient and practical expedient, since a large number of motors, each of which can be applied to a separate axle, can be employed with a less complicated switch or controlling device than could be employed if each of the motors formed a separate element in the combinations. It should be clearly understood, however, that the series of diagrams, Fig. 1, is the same as the series of diagrams, Fig. 2, the motors A, B, C, Fig. 1, being substituted for the pairs of motors A, A', B, B', and C, C', in Fig. 2.

Referring then to Fig. 3, a number of terminals or brushes $a, b, c, d, e, f, g, h, i, j, k, l, m, n$, are permanently connected respectively to the trolley T, ground G, resistances R, R' and $R^2$ and the series pairs of motors, A, A', B, B', and C, C', which are the equivalent of the single motors A, B and C, Fig. 1. The surface of the switch cylinder F is covered with conducting and insulating material F' and $F^2$ respectively, so arranged that as the said cylinder travels and the brushes come in contact with successive portions thereof, the connections of the motors and resistances are varied between the trolley T and ground G, as shown in diagram, Fig. 1, the different positions being numbered consecutively from one to twelve. In the diagram, Fig. 3, three separate resistances R, R' and $R^2$ are shown for the sake of simplifying said diagram, but as in no case are more than one of these resistances in circuit at a time it is obvious that the same resistance may be used consecutively by a proper arrangement of the terminals thereof.

Referring to the diagram, Fig. 2, it will be seen that in the first or starting position, marked 1, all the motors are in series between the trolley T and ground G, with a resistance corresponding to R in the diagram, Fig. 2, in circuit therewith. The way in which this connection is made is shown in Fig. 3, the terminals $a, b, c$, &c., all being in contact with the conducting material on the surface thereof, while the terminals $b$ and $c$ of resistance R are separated by a strip of insulating material so that the current must pass through said resistance in going from terminal $a$ to terminal $c$. And in like manner the current is directed through each pair of motors in series because of the insulating material between terminals $d$ and $e$, $h$ and $i$, and $l$ and $m$. In the second position, marked 2, the motors are all in series with no resistance in circuit, and reference to Fig. 3 shows that the only change made is the removal of the strip of insulating material between terminals $b$ and $c$, of resistance R, so that the said resistance is dead short-circuited through the conducting surface of the switch between terminals $a$ and $d$. In like manner the succeeding changes may be traced by assuming that the terminals $a$, $b$, $c$, &c., are successively in the positions on the developed surface of the cylinder which they would assume in practice as the cylinder is rotated. In the third position, Figs. 1 and 2, the conditions governing motors B, B′ and C, C′ are unchanged, but a shunt path containing resistance is provided around motors A, A′. In position four, the resistance is removed from said shunt path, and in position five, motors A, A′ are open-circuited, the amount of current flowing through them having been sufficiently reduced by means of the shunt path provided in position four to render such open-circuiting possible with no injurious results. In position six motors B, B′ and C, C′ are still connected in the same way and would be in series between the trolley and the ground but for the fact that the motors A, A′ are included in a shunt path between the trolley and motors C, C′ and a resistance corresponding to R′, Fig. 2, is also included in said shunt. Thus motors A, A′ and B, B′ are connected in parallel between trolley T and motors C, C′, the resistance in the branch containing motors A, A′ preventing too sudden a rush of current in said motors on re-introducing them into circuit. This resistance is next removed as shown in position seven, two pairs thus being connected in parallel, and said parallel circuit being in series with motors C, C′. In position eight a shunt containing resistance is introduced around motors C, C′ preparatory to open-circuiting said motors in position ten, the said resistance having first been removed in position nine. In position eleven the motors C, C′ are reconnected to trolley T by a circuit containing resistance, and said resistance is then removed in position twelve, wherein the three series pairs of motors are connected in parallel between trolley T and ground G.

In the above manner any number of motors may be easily handled with very little complication, and the change from the starting position with all the motors in series to the position of maximum speed with three or more motors or series sets of motors in parallel, is gradual and devoid of bad results, while the introduction of resistance into the circuit is required in only five of the twelve positions. The resistance is permitted to remain in circuit only until sufficient counter-electromotive force is developed in said circuit to admit of its being safely cut out, and a requisite number of running positions with no resistance whatever in circuit is attained. It is to be noted, moreover, that at no time between the full series, or starting position, and the full multiple, or high speed position, is there more than one motor or pair of motors out of circuit. When, therefore, three or more motors, or pairs of motors, are employed, more than half of them are constantly at work while the vehicle is in motion, and the greater the number of motors used, the greater will be the proportion of active motors during the entire series of changes from low to high speed and the reverse. In practice, moreover, the resistance employed during the changes of connection, as hereinbefore described, would be variable or in the nature of a rheostat so as to be gradually cut in or out, at no time completely breaking the circuit after the current is permitted to flow through the motors.

What I claim as new, and desire to secure by Letters Patent, is—

1. The method of changing three or more motors from series to parallel connection, which consists in shunting one motor, disconnecting it from the series and connecting it in parallel with another but in series with the remaining motors, and afterward successively shunting the remaining motors, respectively disconnecting them from the series and bringing them into parallel with those already in parallel, substantially as described.

2. The method of controlling or governing the speed of a vehicle driven by a plurality of electric motors, which consists in permanently connecting said motors in series pairs or groups, and varying the connections between said pairs or groups by means of a switch or similar device whereby said groups are first connected in series with a resistance, the resistance then cut out, a pair or group as a unit then shunted through a resistance, said resistance cut out and said group open-circuited and then connected in parallel with another group but in series with the remaining groups, and afterward by similar steps successively disconnecting the remaining groups from the series circuit and connecting them in parallel with those already in parallel until all of said pairs or groups are in parallel with one another, as set forth.

In witness whereof I have hereunto set my hand this 23d day of November, 1893.

EDWARD D. PRIEST.

Witnesses:
JOHN W. GIBBONEY,
BENJAMIN B. HULL.